(12) United States Patent
Ichikawa et al.

(10) Patent No.: US 8,277,968 B2
(45) Date of Patent: Oct. 2, 2012

(54) REACTIVE POLYMER-SUPPORTING POROUS FILM FOR BATTERY SEPARATOR AND USE THEREOF

(75) Inventors: Tomoaki Ichikawa, Osaka (JP); Yoshihiro Uetani, Osaka (JP); Shigeru Fujita, Osaka (JP); Keisuke Kii, Osaka (JP); Satoshi Nishikawa, Osaka (JP); Shinji Bessyo, Osaka (JP)

(73) Assignees: Nitto Denko Corporation, Osaka (JP); Sunstar Giken Kabushiki Kaisha, Osaka (JP)

( * ) Notice: Subject to any disclaimer, the term of this patent is extended or adjusted under 35 U.S.C. 154(b) by 1240 days.

(21) Appl. No.: 11/795,023

(22) PCT Filed: Jan. 10, 2006

(86) PCT No.: PCT/JP2006/300413
§ 371 (c)(1),
(2), (4) Date: Mar. 11, 2008

(87) PCT Pub. No.: WO2006/075728
PCT Pub. Date: Jul. 20, 2006

(65) Prior Publication Data
US 2009/0098464 A1    Apr. 16, 2009

(30) Foreign Application Priority Data
Jan. 11, 2005   (JP) ................. 2005-003474

(51) Int. Cl.
*H01M 2/14* (2006.01)
*H01M 2/16* (2006.01)
(52) U.S. Cl. ........ 429/129; 429/249; 429/134; 429/135; 429/303; 429/208; 429/144
(58) Field of Classification Search .................. 429/129, 429/134, 135, 303, 208, 249, 144
See application file for complete search history.

(56) References Cited

U.S. PATENT DOCUMENTS

| | | | | | |
|---|---|---|---|---|---|
| 3,928,288 | A | * | 12/1975 | Walker | 525/504 |
| 4,659,474 | A | * | 4/1987 | Perry et al. | 210/638 |
| 4,839,203 | A | * | 6/1989 | Davis et al. | 427/244 |
| 4,889,636 | A | * | 12/1989 | Perry et al. | 210/651 |
| 6,686,095 | B2 | * | 2/2004 | Hayase et al. | 429/300 |
| 2003/0017353 | A1 | * | 1/2003 | Yamaguchi et al. | 428/483 |
| 2004/0101757 | A1 | * | 5/2004 | Kii et al. | 429/253 |
| 2004/0157118 | A1 | * | 8/2004 | Uetani et al. | 429/144 |
| 2006/0099497 | A1 | * | 5/2006 | Uetani et al. | 429/144 |
| 2006/0257727 | A1 | * | 11/2006 | Uetani et al. | 429/144 |
| 2007/0184340 | A1 | * | 8/2007 | Ichikawa et al. | 429/144 |
| 2009/0202898 | A1 | * | 8/2009 | Ichikawa et al. | 429/144 |
| 2010/0183908 | A1 | * | 7/2010 | Take et al. | 429/144 |
| 2010/0325877 | A1 | * | 12/2010 | Murata et al. | 29/623.1 |
| 2011/0232081 | A1 | * | 9/2011 | Uetani et al. | 29/623.1 |
| 2011/0232836 | A1 | * | 9/2011 | Uetani et al. | 156/230 |

FOREIGN PATENT DOCUMENTS

| | | |
|---|---|---|
| JP | 2001-176555 | 6/2001 |
| JP | 2004-185920 | 7/2004 |
| JP | 2004-335210 | 11/2004 |
| JP | 2005-209474 | 8/2005 |
| JP | 2006-12562 | 1/2006 |
| WO | 2005-020350 | 3/2005 |

OTHER PUBLICATIONS

Derwent abstract of JP 2004-335210 Nishikawa et al., Nov. 25, 2004.*
Machine translation of JP 2004-335210 Nishikawa et al. Nov. 25, 2004.*

* cited by examiner

*Primary Examiner* — Peter F Godenschwager
*Assistant Examiner* — Jane L Stanley
(74) *Attorney, Agent, or Firm* — Wenderoth, Lind & Ponack, L.L.P.

(57) ABSTRACT

Provided is a reactive polymer-supporting porous film for use as a battery separator which comprises a porous substrate film and a partially crosslinked reactive polymer supported on the porous substrate film, the partially crosslinked reactive polymer being obtained by the reaction of a crosslinkable polymer having at least one reactive group selected from the group consisting of 3-oxetanyl group and epoxy group in the molecule with a monocarboxylic acid. Further, provided is a method of manufacturing a battery which comprises layering electrodes on the reactive polymer-supporting porous film.

17 Claims, No Drawings

REACTIVE POLYMER-SUPPORTING POROUS FILM FOR BATTERY SEPARATOR AND USE THEREOF

FIELD OF THE INVENTION

This invention relates to a reactive polymer-supporting porous film for use as a battery separator which comprises a porous substrate film and a partially crosslinked reactive polymer supported thereon, and a method of manufacturing a battery in which electrodes are bonded to the separator with such a reactive polymer-supporting porous film.

PRIOR ART

Recently, a lithium ion secondary battery is in wide use as a power source for compact portable electronic appliances such as a cell phone, a laptop personal computer and the like. Such a lithium ion secondary battery is manufactured by laminating or rolling sheet-like cathode (positive electrode) and anode (negative electrode) and a porous polyolefin film together, placing the laminated or rolled body in a battery container of a metal can, pouring an electrolytic solution into the battery container, and air-tightly closing and sealing the container, as described in JP-A-09-161814 and JP-A-11-329439.

However, such a battery has a problem that when it is left standing in a high temperature environment, or when it is overcharged or when short circuit takes place between the electrodes, it suddenly generates heat and has a high temperature. Thus, under some circumstances, there is a danger that electrolytic solution might spout out of the battery, and the battery might be destroyed.

On the other hand, in many cases, particularly in laminate-type batteries, there has been employed a method in which electrodes and a separator are bonded using a solution of poly(vinylidene fluoride) resin as an adhesive, and then the solvent used in the resin solution is evaporated under reduced pressure, for example, as described in JP 10-177865 A. However, this method needs complicated steps, but also the quality of the product obtained cannot be easily stabilized, and moreover, the method involves a problem that adhesion between the electrodes and the separator is not enough.

In the meantime, a variety of methods are conventionally known to produce a porous film for use as a battery separator. As one of the methods, it is known that sheet of polyolefin resin is produced and is stretched at a high stretching ratio, as described in JP-A-9-12756. However, a battery in which such a separator obtained by stretching a porous film at a high stretching ratio is incorporated has a problem that the separator remarkably shrinks, and in some cases, it does not function as a partition wall between electrodes under high temperature environment, for example, when internal short circuit takes place inside the battery so that the temperature thereof abnormally elevates, and in some cases, the separator does not function as a partition wall between the electrodes.

Therefore, reduction of heat shrinkage of battery separator under such high temperature environment has been realized to be a very important problem to be solved to improve safety of batteries. In this regard, in order to suppress heat shrinkage of battery separator under high temperature environment, a method is known for example, in which ultrahigh molecular weight polyethylene and a plasticizer are melted and kneaded together, and the mixture is extruded into sheet from a die, followed by removing the plasticizer from the sheet by extraction, thereby producing porous film for use as a battery separator, as described in JP-A-5-310989. However, in this method, since the porous film obtained has not been stretched, contrary to the method mentioned above, the problem is that the film has no sufficient strength.

The invention has been completed to overcome the problems involved in the conventional methods for manufacture of batteries in which electrodes are bonded to a separator. Therefore, it is an object of the invention to provide a reactive polymer-supporting porous film for use as a battery separator, which is suitably used for manufacture of a battery having sufficient adhesion between electrodes and a separator, low internal resistance and high rate discharge performance. It is also an object of the invention to provide a method for manufacture of battery using such a reactive polymer-supporting porous film as mentioned above.

DISCLOSURE OF THE INVENTION

The invention provides a reactive polymer-supporting porous film for use as a battery separator which comprises a porous substrate film and a partially crosslinked reactive polymer supported thereon, the partially crosslinked reactive polymer being obtained by the reaction of a crosslinkable polymer having at least one reactive group selected from the group consisting of 3-oxetanyl group and epoxy group in the molecule with a monocarboxylic acid.

The invention also provides a method of producing such a reactive polymer-supporting porous film for use as a battery separator which comprises supporting a crosslinkable polymer having at least one reactive group selected from the group consisting of 3-oxetanyl group and epoxy group in the molecule and a monocarboxylic acid on a porous substrate film; reacting a part of the reactive groups with the monocarboxylic acid thereby partially crosslinking the reactive polymer and forming the reactive polymer on the porous substrate film.

The invention further provides a method of manufacturing a battery which comprises obtaining an electrode/reactive polymer-supporting porous film layered body by layering electrodes on such a reactive polymer-supporting porous film as mentioned above; placing the electrode/reactive polymer-supporting porous film layered body in a battery container; introducing an electrolytic solution containing a cationic polymerization catalyst into the battery container so that at least a portion of the reactive polymer is swollen or dissolved in the electrolytic solution at least in the vicinity of the interface of the porous film and the electrodes to cause cationic polymerization of the remaining reactive groups of the reactive polymer and further crosslinking of the reactive polymer so that the electrodes are bonded to the porous film.

BEST MODE FOR CARRYING OUT THE INVENTION

The reactive polymer-supporting porous film for use as a battery separator of the invention comprises a porous substrate film and a partially crosslinked reactive polymer supported thereon, the partially crosslinked reactive polymer being obtained by the reaction of a crosslinkable polymer having at least one reactive group selected from the group consisting of 3-oxetanyl group and epoxy group in the molecule with a monocarboxylic acid. Herein the invention, the partial crosslinking of crosslinkable polymer means that only a part of the reactive groups of the crosslinkable polymer is reacted with monocarboxylic acid, thereby to partly crosslink the crosslinkable polymer.

The porous substrate film used has a thickness preferably in a range of 3 to 50 μm. When the porous film has a thickness of less than 3 μm, it has an insufficient strength so that when it is used as a separator in a battery, inner short circuit may possibly take place. On the other hand, when the porous film has a thickness of more than 50 µm, it makes the distance between the electrodes too large in a resulting battery thereby undesirably increasing the inner resistance.

In addition, the porous substrate film used has fine pores having an average pore diameter of 0.01 to 5 µm and a porosity in a range of 20 to 95%, preferably 30 to 90%, and most preferably 35 to 85%. When the porous substrate film has a so small porosity, the resulting battery has decreased ionic conducting channels and thus fails to have sufficient performance if it is used as a separator in a battery. On the other hand, when the porous substrate film has a so large porosity, it has an insufficient strength for use as a separator in a battery. If such a porous substrate film is to have a sufficient strength as a separator, the film used must be thick, which results in undesirable increase of inner resistance of battery, Further, the porous substrate film used has an air permeability preferably of 1500 s/100 cc or less, more preferably 1000 s/100 cc or less. When the porous substrate film used has a too large air permeability, it has a too small ionic conductivity for use as a separator in a battery so that it fails to provide a high performance battery. The porous substrate film used has a piercing strength preferably of 1 N or more. When the porous substrate film having a piercing strength of smaller than 1 N is used as a separator and pressure is applied between the electrodes, it is torn and inner short circuit may take place.

Any porous film may be used as the porous substrate film with no particular limitation so long as it has such properties as mentioned above. However, in consideration of solvent resistance and redox resistance, a porous film of polyolefin resin such as polyethylene or polypropylene is preferred. Among the exemplified above, a porous film made of polyethylene is particularly preferred since it melts when being heated and closes the fine pores so that it provides so-called shut down function with a battery. In this connection, the polyethylene may include not only homopolymers of ethylene but also copolymers of ethylene with an α-olefin such as propylene, butene or hexene. Further, a laminate film of a porous film of polytetrafluoroethylene, polyimide and the like with the above-mentioned polyolefin porous film is also excellent in the heat resistance and therefore is used preferably as the porous substrate film.

According to the invention, the crosslinkable polymer refers to a polymer having at least one reactive group selected from the group consisting of 3-oxetanyl group and epoxy group in the molecule. It is preferably a radical copolymer of at least one radical polymerizable monomer selected from the group consisting of a radical polymerizable monomer having 3-oxetanyl group and a radical polymerizable monomer having an epoxy group with another radical polymerizable monomer (which will be often referred to the third radical polymerizable monomer).

In particular, the crosslinkable polymer is preferably a polymer having 3-oxetanyl and epoxy groups in the molecule, or a polymer having 3-oxetanyl groups or epoxy groups in the molecule. Accordingly, such a crosslinkable polymer can be obtained preferably either by radical copolymerization of a radical polymerizable monomer having 3-oxetanyl group and a radical polymerizable monomer having an epoxy group with another radical polymerizable monomer, or by radical copolymerization of a radical polymerizable monomer having 3-oxetanyl group with another radical polymerizable monomer, or by radical copolymerization of a radical polymerizable monomer having an epoxy group with another radical polymerizable monomer.

As already known, either 3-oxetanyl or epoxy group reacts on one hand with carboxyl groups and on the other hand it is capable of cationic polymerization. Therefore, according to the invention, at first a crosslinkable polymer having at least one reactive group selected from the group consisting of 3-oxetanyl group and epoxy groups in the molecule is reacted with a monocarboxylic acid making use of such reactive groups to obtain a partially crosslinked reactive polymer, and then the crosslinked reactive polymer is supported on the porous substrate film thereby to provide a reactive polymer-supporting porous film for use as a battery separator.

Further according to the invention, as described hereinafter, electrodes are layered on such a reactive polymer-supporting porous film to provide an electrode/reactive polymer-supporting porous film layered body, and then the layered body is immersed in an electrolytic solution containing a cationic polymerization catalyst, preferably an electrolyte working also as a cation polymerization catalyst, so that at least a portion of the crosslinkable polymer that has been partially crosslinked or the resulting reactive polymer on the porous film is swollen, or dissolved in and diffused into the electrolytic solution, followed by being further crosslinked by cationic polymerization of the remaining reactive groups. This causes gelation of the electrolytic solution in the vicinity of the interface of the porous film and the electrodes, and consequently, the electrodes and the porous film are bonded together.

When the crosslinkable polymer having at least one reactive group selected from the group consisting of 3-oxetanyl group and epoxy group in the molecule is prepared, a 3-oxetanyl group-containing radical polymerizable monomer and/or an epoxy group-containing radical polymerizable monomer is used in terms of total amount of these monomers in an amount of 5 to 50% by weight, preferably 10 to 30% by weight of the total monomers used. Accordingly, when a crosslinkable polymer having 3-oxetanyl group is prepared, the 3-oxetanyl group-containing radical polymerizable monomer is used in an amount of 5 to 50% by weight, preferably 10 to 30% by weight, of the total monomers used. Similarly, when a crosslinkable polymer having epoxy group is obtained, the epoxy group-containing radical polymerizable monomer is used in an amount of 5 to 50% by weight, preferably 10 to 30% by weight, of the total monomers used.

On the other hand, when a crosslinkable polymer having both 3-oxetanyl and epoxy groups in the molecule is prepared by radical copolymerization of both of a 3-oxetanyl group-containing radical polymerizable monomer and an epoxy group-containing radical polymerizable monomer with the third radical polymerizable monomer, the total amount of the 3-oxetanyl group-containing radical polymerizable monomer and the epoxy group-containing radical polymerizable monomer is in a range of 5 to 50% by weight, preferably in a range of 10 to 30% by weight, of the total monomers used. In this case, the epoxy group-containing radical polymerizable monomer is used in an amount of 90% by weight or less of the total of the 3-oxetanyl group-containing radical polymerizable monomer and the epoxy group-containing radical polymerizable monomer.

In the preparation of a 3-oxetanyl group-containing crosslinkable polymer or an epoxy group-containing crosslinkable polymer, when the total amount of the 3-oxetanyl group-containing radical polymerizable monomer and the epoxy group-containing radical polymerizable monomer is less than 5% by weight of the total monomers used, the amount of the crosslinkable polymer needed for gelation of the electrolytic solution increases, so that the performance of the resulting battery is adversely affected, as described above.

On the other hand, when it exceeds 50% by weight, the formed gel is deteriorated in retention of the electrolytic solution, thereby to lower the adhesion strength between the electrodes and separator in the resulting battery.

According to the invention, a 3-oxetanyl group-containing (meth)acrylate represented by the general formula (I)

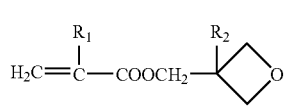 (I)

wherein $R_1$ is a hydrogen atom or a methyl group, and $R_2$ is a hydrogen atom or an alkyl having 1 to 6 carbon atoms, is preferably used as the 3-oxetanyl group-containing radical polymerizable monomer.

Examples of the 3-oxetanyl group-containing (meth)acrylate include 3-oxetanylmethyl (meth)acrylate, 3-methyl-3-oxetanylmethyl (meth)acrylate, 3-ethyl-3-oxetanylmethyl (meth)acrylate, 3-butyl-3-oxetanylmethyl (meth)acrylate, and 3-hexyl-3-oxetanylmethyl (meth)acrylate. These (meth)acrylates may be used alone or in combination of two or more of these. In the invention, (meth)acrylate means acrylate or methacrylate.

In turn, an epoxy group-containing (meth)acrylate represented by the general formula (II)

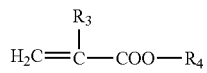 (II)

wherein $R_3$ is a hydrogen atom or a methyl group and $R_4$ is an epoxy group-containing group represented by the following formula (1)

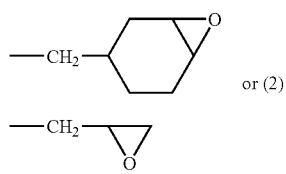 (1) or (2)

is preferably used as the epoxy group-containing radical polymerizable monomer.

Examples of the epoxy group-containing (meth)acrylate include 3,4-epoxycyclohexylmethyl (meth)acrylate and glycidyl (meth)acrylate. These (meth)acrylates are used alone or in combination of two or more of these.

The aforesaid third radical polymerizable monomer that is copolymerized with the 3-oxetanyl group-containing radical polymerizable monomer and/or the epoxy group-containing radical polymerizable monomer is preferably at least one selected from the group consisting of (meth)acrylates represented by the general formula (III)

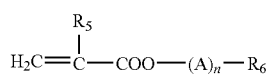 (III)

wherein $R_5$ is a hydrogen atom or a methyl group; A is an oxyalkylene group having 2 or 3 carbon atoms (preferably oxyethylene or oxypropylene group); $R_6$ is an alkyl group having 1 to 6 carbon atoms or a fluoroalkyl group having 1 to 6 carbon atoms; and n is an integer of 0 to 3, and vinyl esters represented by the general formula (IV)

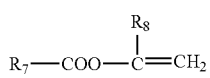 (IV)

wherein $R_7$ is a methyl group or an ethyl group and $R_8$ is a hydrogen atom or a methyl group.

Examples of the (meth)acrylates represented by the general formula (III) include methyl (meth)acrylate, ethyl (meth)acrylate, propyl (meth)acrylate, butyl (meth)acrylate, 2,2,2-trifluoroethyl (meth)acrylate, and 2,2,3,3-tetrafluoropropyl (meth)acrylate.

Other than the exemplified above, the following can be mentioned as the aforesaid third radical polymerizable monomer in which $R_5$ is a hydrogen atom or a methyl group, and n is an integer of 0 to 3.

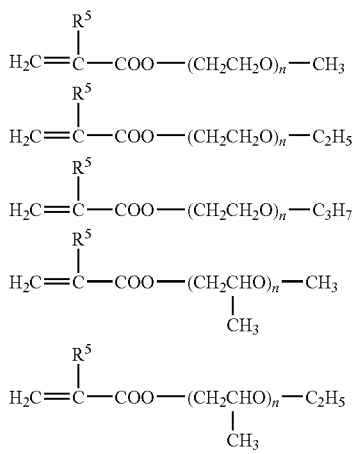

Among the (meth)acrylates represented by the general formula (III), there may be mentioned ethyl acrylate, butyl acrylate, propyl acrylate, isooctyl acrylate, 2-ethylhexyl acrylate and dodecyl acrylate as examples of the third radical polymerizable monomer which can adjust the glass transition temperature of the resulting reactive polymer to be 70° C. or less, as mentioned hereinafter. Examples of the above-mentioned vinyl esters represented by the general formula (IV) include vinyl acetate and vinyl propionate.

As described above, the crosslinkable polymer having at least one reactive group selected from the group consisting of 3-oxetanyl group and epoxy group can be obtained as a radical copolymer preferably by radical copolymerization of at least one radical polymerizable monomer selected from the group consisting of 3-oxetanyl group-containing radical polymerizable monomers and epoxy group-containing radical polymerizable monomers with another radical polymerizable monomer using a radical polymerization initiator. The radical copolymerization may be carried out by any polymerization method such as solution polymerization, bulk polymerization, suspension polymerization or emulsion polymerization. In terms of the easiness of polymerization, adjustment of molecular weight, and post-treatment, solution polymerization or suspension polymerization is preferably employed.

The radical polymerization initiator used is not particularly limited. For example, N,N'-azobis(isobutyronitrile), dimethyl N,N'-azobis(2-methylpropionate), benzoyl peroxide or lauroyl peroxide can be used. In the radical copolymerization, if necessary, a molecular weight adjusting agent such as mercaptan may be used.

It is preferred that the crosslinkable polymer has a weight average molecular weight of 10,000 or more. When the weight average molecular weight of the crosslinkable polymer is less than 10,000, a large quantity of the crosslinkable polymer is required for gelation of the electrolytic solution, so that the performance of the battery obtained may be deteriorated. On the other hand, the upper limit of the weight average molecular weight of the crosslinkable polymer is not particularly limited, however it is about 3,000,000 so that it keeps the electrolytic solution in the form of gel and preferably about 2,500,000. It is particularly preferred that the crosslinkable polymer has a weight average molecular weight in a range of 100,000 to 2,000,000.

The above-mentioned crosslinkable polymer having at least one reactive group selected from the group consisting of 3-oxetanyl group and epoxy groups in the molecule are already known, as described in JP-A-2001-176555 and 2002-110245.

The reactive polymer-supporting porous film for use as a battery separator of the invention comprises a porous substrate film and a reactive polymer supported thereon, the reactive polymer being obtained by reacting the above-mentioned crosslinkable polymer with a monocarboxylic acid so that it is partially crosslinked. It is believed that the crosslinking of the crosslinkable polymer by the reaction thereof with a monocarboxylic acid takes place in the following manner. First, the crosslinkable polymer reacts at its 3-oxetanyl or epoxy groups with the carboxylic acid so that the carboxylic acid is esterified to generate ester groups and alcoholic hydroxyl groups in the crosslinkable polymer. Then, the thus generated alcoholic hydroxyl groups react with the 3-oxetanyl group or epoxy groups of the crosslinkable polymer under catalysis of the carboxylic acid, thereby to cause ring-opening reaction of the groups while the hydroxyl groups are etherified. According to the invention, the crosslinkable polymer reacts with the monocarboxylic acid in this way by making use of such reactivity of 3-oxetanyl and epoxy groups, thereby the crosslinkable polymer is partially crosslinked to provide the reactive polymer.

The monocarboxylic acid used in the invention to partially crosslink the crosslinkable polymer is an organic acid which has one carboxyl group in the molecule. The monocarboxylic acid used is not specifically limited, but any monocarboxylic acid may be used. The monocarboxylic acid may be an aliphatic monocarboxylic acid, an aromatic monocarboxylic acid, or an alicyclic monocarboxylic acid. The monocarboxylic acid may be either a saturated compound or an unsaturated compound, and may have an inactive substituent thereon, such as an alkyl group, a hydroxyl group, an alkoxyl group, an amino group, a nitro group, or the like.

Examples of saturated aliphatic monocarboxylic acids include, for example, formic acid, acetic acid, propionic acid, butyric acid, isobutyric acid, valeric acid, isovaleric acid, caproic acid, isocaproic acid, 2-methylvaleric acid, 2-ethylbutyric acid, heptanoic acid, caprylic acid, 2-ethylhexanoic acid, nonanoic acid, capeylic acid, undecanoic acid, lauric acid, myristic acid, palmitic acid, and stearic acid. Examples of unsaturated aliphatic monocarboxylic acids include, for example, propiolic acid, acrylic acid, crotonic acid, methacrylic acid, pentenoic acid, hexenoic acid, sorbic acid, heptenoic acid, undecenoic acid, linolenic acid, linolic acid, linoelaidic acid, elaidic acid, oleic acid, ricinoleic acid, and arachidonic acid.

Examples of aromatic monocarboxylic acids include, for example, benzoic acid, toluic acid, ethylbenzoic acid, propylbenzoic acid, isopropylbenzoic acid, butylbenzoic acid, isobutylbenzoic acid, s-butylbenzoic acid, t-butylbenzoic acid, hydroxybenzoic acid, anisic acid, ethoxybenzoic acid, propoxybenzoic acid, isopropoxybenzoic acid, butoxy benzoic acid, isoprpoxybenzoic acid, s-butoxybenzoic acid, t-butoxybenzoic acid, aminobenzoic acid, N-methylaminobenzoic acid, N-ethylamino benzoic acid, N-ropylaminobenzoic acid, N-isopropylaminobenzoic acid, N-butylaminobenzoic acid, N-isobutylaminobenzoic acid, N-s-butyl-aminobenzoic acid, N-t-butylaminobenzoic-acid, N,N-dimethylamino-benzoic acid, N,N-diethylaminobenzoic acid, nitrobenzoic acid, resorcylic acid, phenylacetic acid, and benzylacetic acid.

Examples of alicyclic monocarboxylic acids include, for example, cyclopropanecarboxylic acid, cyclobutanecarboxylic acid, cyclopentanecarboxylic acid, 1-methylcyclopentanecarboxylic acid, 2-methylcyclopentanecarboxylic acid, 3-methylcyclopentane-carboxylic acid, 1-phenylcyclopentanecarboxylic acid, cyclopentene-carboxylic acid, cyclohexanecarboxylic acid, 1-methylcyclohexane-carboxylic acid, 2-methylcyclohexanecarboxylic acid, 3-methylcyclohexanecarboxylic acid, 4-methylcyclohexanecarboxylic acid, 4-propylcyclohexanecarboxylic acid, 4-butylcyclohexane-carboxylic acid, 4-pentylcyclohexanecarboxylic acid, 4-hexyl-cyclohexanecarboxylic acid, 4-phenylcyclohexanecarboxylic acid, 1-phenylcyclohexanecarboxylic acid, cyclohexenecarboxylic acid, 4-butylcyclohexenecarboxylic acid, cycloheptanecarboxylic acid, 1-cycloheptenecarboxylic acid, 1-methylcycloheptanecarboxylic acid, 4-methylcycloheptane carboxylic acid, and cyclohexylacetic acid.

The reactive polymer-supporting porous film for use as a battery separator of the invention comprises a porous substrate film and a reactive polymer supported thereon, wherein the reactive polymer is formed by reacting the above-mentioned crosslinkable polymer with the above-mentioned monocarboxylic acid so that it is partially crosslinked. A method of supporting the reactive polymer on the porous substrate film is not particularly limited. For example, a crosslinkable polymer is dissolved in an appropriate solvent such as acetone, ethyl acetate or butyl acetate together with a monocarboxylic acid, and then either the resulting solution is applied to a porous substrate film by casting or spray coating, or a porous substrate film is impregnated with the solution, followed by drying the film to remove the solvent used therefrom, thereby supporting the crosslinkable polymer and the monocarboxylic acid on the porous film. Then, the porous substrate film thus supporting the crosslinkable polymer and the monocarboxylic acid is heated to an appropriate temperature to cause the reaction of the crosslinkable polymer with the monocarboxylic acid to partially crosslink the crosslinkable polymer as described above. In this way, the reactive polymer-supporting porous film for use as a battery separator of the invention is obtained.

If necessary, an onium salt may be supported as a catalyst together with the crosslinkable polymer and the monocarboxylic acid on the porous substrate film. As the onium salts, those which are exemplified later may be used.

The means or method of supporting the reactive polymer obtained by partially crosslinking the crosslinkable polymer with a monocarboxylic acid on the porous substrate film is not limited to those as above exemplified. For example, as another method, a solution of the crosslinkable polymer is applied to a porous substrate film, and after the film is dried, a solution of a monocarboxylic acid is applied to the porous substrate film or the porous substrate film is impregnated with the solution, followed by heating the film at an appropriate temperature. As a further method, a crosslinkable polymer is reacted with a monocarboxylic acid in a solvent and is partially crosslinked to provide a reactive polymer, and thereafter the resulting solution containing the reactive polymer is applied to a porous substrate film and the film is dried. As a still further method, a crosslinkable polymer is reacted with a monocarboxylic acid in a solvent and is partially crosslinked to provide a reactive polymer, and thereafter the resulting solution containing the reactive polymer is applied to release paper, and then the reactive polymer is transferred to a substrate porous film from the release paper.

However, one of the particularly preferred methods according to the invention is as follows. A solution containing both of the crosslinkable polymer and a monocarboxylic acid is applied to release sheet and dried to form a crosslinkable polymer/monocarboxylic acid layer on the release sheet. Thereafter, the release sheet is layered on a porous substrate film and is heated under pressure to transfer the crosslinkable polymer/monocarboxylic acid layer to the porous substrate film. Then, the crosslinkable polymer/monocarboxylic acid layer on the porous film is heated to an appropriate temperature so that a reactive polymer is formed on the porous substrate film.

Particularly, a crosslinkable polymer having a glass transition temperature preferably of 70° C. or less can be obtained by copolymerizing at least one radical polymerizable monomer selected from the group consisting of 3-oxetanyl group-containing radical polymerizable monomers and epoxy group-containing radical polymerizable monomers with a suitably selected third radical polymerizable monomer as mentioned hereinbefore. Therefore, when a crosslinkable polymer/monocarboxylic acid layer is formed on release sheet using such a crosslinkable polymer as described above, the layer can be transferred to a porous substrate film by heating the layer at a temperature of not less than the glass transition temperature of the crosslinkable polymer and of not more than 100° C. under pressure without causing any damage to the porous substrate film. The crosslinkable polymer/monocarboxylic acid layer thus transferred to the porous substrate film is heated at an appropriate temperature to readily form a layer of reactive polymer on the porous substrate film.

When the crosslinkable polymer/monocarboxylic acid layer on the release sheet is transferred to a porous substrate film, it is preferred to adjust the heating temperature at 100° C. or less so as not to cause deformation or melting of the porous substrate film. Accordingly, the glass transition temperature of the crosslinkable polymer is preferably in a range of 20 to 60° C.

As the above-mentioned release sheet, a polypropylene resin sheet is a typical one, however it is not particularly limited and sheets made of polyethylene terephthalate, polyethylene, vinyl chloride, and engineering plastics; paper (particularly, resin-impregnated paper); synthetic paper; and their laminates may be usable. These sheets may be surface-treated in the rear faces with silicone or long chain alkyl type compounds, if necessary.

When the crosslinkable polymer/monocarboxylic acid layer is formed on a porous substrate film by transferring the crosslinkable polymer/monocarboxylic acid layer from release sheet to a porous substrate film in such a manner as mentioned above, the crosslinkable polymer/monocarboxylic acid layer can be reliably formed on the surface of the porous substrate film since the crosslinkable polymer or the crosslinkable polymer/monocarboxylic acid is prevented from penetrating the fine pores of the porous film, and accordingly without closing the fine pores of porous substrate film, unlike the case of applying a solution of the crosslinkable polymer or a solution of the crosslinkable polymer/monocarboxylic acid to the surface of the porous substrate film.

According to the invention, it is preferred that the reactive polymer obtained by partially crosslinking the crosslinkable polymer has an insoluble matter in a proportion of 1 to 90%, preferably 3 to 75%, and most preferably 10 to 65% based on the weight of reactive polymer. The proportion of insoluble matter means, as described later, the amount of the reactive polymer remaining on the porous substrate film when the porous film supporting the partially crosslinked reactive polymer is immersed in ethyl acetate at 23° C. for 7 days and then dried.

Such a reactive polymer having an insoluble matter in a proportion of 1 to 90% can be obtained usually by reacting the crosslinkable polymer with a monocarboxylic acid to partially crosslink the crosslinkable polymer in a manner in which a monocarboxylic acid is used so that the amount of the carboxyl groups of the monocarboxylic acid used is in a range of 0.01 to 1.0 part by mole, preferably 0.05 to 0.8 parts by mole, and particularly preferably 0.1 to 0.7 parts by mole to one part by mole of the reactive groups of the crosslinkable polymer, and in addition, by appropriately adjusting the conditions under which the crosslinkable polymer and the monocarboxylic acid are reacted under heating. In this manner, a reactive polymer having a desired proportion of insoluble matter can be obtained.

By way of example, a reactive polymer having an insoluble matter in a proportion of 1-90% can be obtained by using a monocarboxylic acid in such an amount that it has 0.5-1.0 part by mole of carboxyl groups in relation to 1 part by mole of the reactive groups of the crosslinkable polymer, and heating and reacting the crosslinkable polymer with the monocarboxylic acid at a temperature of 50° C. usually over a period of 10 to 500 hours, preferably over 12 to 250 hours.

When the proportion of insoluble matter in the reactive polymer is less than 1% and electrodes are pressure-adhered to a porous film supporting such a reactive polymer thereon to provide an electrode/porous film layered body and the body is immersed in an electrolytic solution, a large portion of the reactive polymer is dissolved and diffused into the electrolytic solution. Therefore, even if the reactive polymer is cationically polymerized and further crosslinked in the electrolytic solution, effective adhesion between the electrodes and the porous film cannot be obtained, as described later. On the other hand, when the proportion of insoluble matter in the reactive polymer is more than 90% and the resulting electrode/porous film layered body is immersed in an electrolytic solution, the reactive polymer is insufficiently swollen, so that the resulting battery containing such an electrode/porous film layered adherent formed of the reactive polymer has high inner resistance and is adversely affected in the battery performance.

The reactive polymer is obtained by reacting the crosslinkable polymer with the monocarboxylic acid so that it is partially crosslinked to have insoluble matter in such an amount as mentioned above. Thus, the reactive polymer is suppressed from dissolving in an electrolytic solution and diffusing thereinto when it is immersed therein. Therefore, when an electrode/porous film layered body is obtained by supporting such a reactive polymer on the porous film and layering the electrodes thereon, and then it is placed in a battery container, an electrolytic solution containing an electrolyte and a cationic polymerization catalyst is poured into the battery container, only a portion of the reactive polymer of the above-mentioned electrode/porous film layered body is swollen or dissolved in the electrolytic solution in the vicinity of the interface of the porous film and the electrodes. Thus, the reactive polymer is cationically polymerized and further crosslinked by the cationic polymerization catalyst, preferably an electrolyte working also as a cationic polymerization catalyst in the electrolytic solution, making use of the remaining reactive groups which have not been used in the partial crosslinking by the monocarboxylic acid, thereby the electrolytic solution is gelled and the electrodes are firmly and closely bonded to the porous film. In this manner, an electrode/porous film (that is a separator of the battery obtained) layered adherent can be obtained in a resulting battery.

That is, according to the invention, the partially crosslinked reactive polymer has an insoluble matter in the above-mentioned range and accordingly when it is immersed in an electrolytic solution, dissolution or diffusion thereof in the electrolytic solution is prevented or suppressed and the reactive polymer is efficiently used for bonding of the porous film to the electrodes, so that the electrodes and the porous film are stably and more firmly bonded to each other by using a relatively small amount of the reactive polymer.

As described above, the reactive polymer-supporting porous film of the invention is preferably usable for manufacture of battery. Hereinafter, a method for manufacture of a battery according to the invention using the reactive polymer-supporting porous film will be described.

Although differing depending on batteries, an electrode to be used, either an anode or a cathode, is generally formed in a sheet-like form by firmly bonding and supporting an active material and a conductive agent if necessary on a conductive substrate by using a binder resin.

At first, sheet-like electrodes described above are layered on the reactive polymer-supporting porous film, or the thus layered product is rolled to obtain an electrode/reactive polymer-supporting porous film layered body. The layered body is placed in a battery made of metal can or laminate film and if necessary, terminals are welded, and then a prescribed amount of an electrolytic solution containing a cationic polymerization catalyst dissolved therein is poured into the battery container and the battery container is air-tightly closed and sealed to give a battery having a separator firmly bonded to the electrodes in such a manner as follows.

When an electrolytic solution is poured into the battery container, at least a portion of the reactive polymer supported on the reactive polymer-supporting porous film is swollen in the vicinity of the interface of the porous film and the electrodes in the electrolytic solution, or dissolved in and diffused into the electrolytic solution, to cause the cationic polymerization and further crosslinking of the reactive polymer. Thus, at least a part of the electrolytic solution is made gel thereby bonding porous film to the electrodes firmly.

As clear from the foregoing, the reactive polymer causes gelation of the electrolytic solution at least in the vicinity of the interface between the porous film and the electrodes when it is crosslinked by cationic polymerization and works so as to bond the electrodes and the porous film.

Although depending on the structure and the supported amount as well as the type and the amount of the cationic polymerization catalyst used, the reactive polymer can be polymerized and crosslinked at a normal temperature, however the cationic polymerization can be promoted by heating. In the case the cationic polymerization is carried out under heating, it is carried out usually at a temperature of 40 to 100° C. for 0.5 to 24 hours in consideration of balance with the heat resistance of the materials composing the battery and the productivity. Further, when a battery is manufactured in such a manner as mentioned above, the resulting content in the battery container may be left standing at a normal temperature for several hours in order to swell the reactive polymer, or in order to dissolve and diffuse the polymer in an amount sufficient to bond the porous film to the electrodes after the electrolytic solution is poured into the battery container, The electrode/reactive polymer-supporting porous film layered body is sufficient if the electrodes are layered on the reactive polymer-supporting porous film. Accordingly, depending on the structure and the form of the battery, the electrode/reactive polymer-supporting porous film layered body may have various layered structures such as a negative electrode/porous film/positive electrode or a negative electrode/porous film/positive electrode/porous film.

The electrolytic solution is a solution comprised of an electrolytic salt dissolved in an appropriate solvent. Examples of the electrolytic salt include salts comprising: cationic components such as hydrogen; alkali metals such as lithium, sodium and potassium; alkaline earth metals such as calcium and strontinum; and tertiary or quaternary ammoniums; and anionic components such as inorganic acids such as hydrochloric acid, nitric acid, phosphoric acid, sulfuric acid, borofluoric acid, hydrofluoric acid, hexafluorophosphoric acid, and perchloric acid and organic acids such as carboxylic acid, organic sulfonic acid, and fluorine-substituted organic sulfonic acid. Among them, an electrolytic salt containing an alkali metal in as a cationic component is preferably used.

Practical examples of the electrolytic salt containing an alkali metal ion as a cationic component are alkali metal perchlorates such as lithium perchlorate, sodium perchlorate, and potassium perchlorate; alkali metal tetrafluoroborates such as lithium tetrafluoroborate, sodium tetrafluoroborate, and potassium tetrafluoroborate; alkali metal hexafluorophosphates such as lithium hexafluorophosphate and potassium hexafluorophosphate; alkali metal trifluoroacetates such as lithium trifluoroacetate; and alkali metal trifluoromethanesulfonates such as lithium trifluoromethanesulfonate.

In particular, when a lithium ion secondary battery is to be obtained according to the invention, lithium hexafluorophosphate, lithium tetrafluoroborate, and lithium perchlorate are used preferably as an electrolytic salt.

The solvent used to dissolve the electrolytic salt may be any solvents if they can dissolve the electrolytic salts. For example, non-aqueous solvents used include cyclic esters such as ethylene carbonate, propylene carbonate, butylene carbonate, and γ-butyrolactone; ethers such as tetrahydrofuran and dimethoxyethane; and chain type esters such as dimethyl carbonate, diethyl carbonate and ethyl methyl carbonate. These solvents may be used alone or in combination of two or more.

Although being suitably determined in accordance with the type and the amount of the solvent used, the amount of the electrolytic salt is adjusted usually to be 1 to 50% by weight in the resulting electrolytic solution.

In the invention, an onium salt is preferably used as a cationic polymerization catalyst. Examples of the onium salt are those comprising cationic components such as ammonium, phosphonium, arsonium, stibonium and iodonium, and anionic components such as tetrafluoroborate, hexafluorophosphate, trifluoromethanesulfonate, and perchlorate.

Among the above-exemplified electrolytic salts, lithium tetrafluoroborate and lithium hexafluorophosphate are preferred since they work themselves as cationic polymerization catalysts as well as the electrolytic salts. In this case, either one of lithium tetrafluoroborate and lithium hexafluorophosphate may be used or both of them may be used in combination.

INDUSTRIAL APPLICABILITY

The reactive polymer-supporting porous film for use as a battery separator of the invention comprises a porous substrate film and a reactive polymer supported thereon. The reactive polymer is derived from a crosslinkable polymer which has at least one reactive group selected from the group consisting of 3-oxetanyl group and epoxy group. The crosslinkable polymer is reacted at a part of the reactive groups with a monocarboxylic acid so that it is partially crosslinked, thereby providing the reactive polymer.

Accordingly, electrodes are layered on the reactive polymer-supporting porous film to obtain an electrode/reactive polymer-supporting porous film layered body; the layered body is placed in a battery container; an electrolytic solution containing a cationic polymerization catalyst is poured into the battery container; at least a portion of the reactive polymer is swollen or dissolved at least in the vicinity of the interface of the porous film and the electrodes in the electrolytic solution; the remaining reactive groups of the reactive polymer are cationically polymerized so that it is further crosslinked, thereby firmly bonding the porous film and the electrodes each other to form an electrode/porous film adherent.

Since the reactive polymer in the reactive polymer-supporting porous film of the invention is previously partially crosslinked, when the electrode/reactive polymer-supporting porous film layered body is immersed in an electrolytic solution, dissolution and diffusion of the reactive polymer from the electrode/reactive polymer-supporting porous film layered body into the electrolytic solution are suppressed while the reactive polymer is swollen in the electrolytic solution. As a result, even a small amount of the reactive polymer can bond the porous film (separator) firmly to the electrodes. Further, the reactive polymer is prevented from excess dissolution and diffusion so that it does not cause any adverse effect on the electrolytic solution.

According to a preferred embodiment of the invention, a layer of the crosslinkable polymer can be transferred to and supported on a porous substrate film at a relatively low temperature. Then, the reactive polymer-supporting porous film having the reactive polymer on the surface can be reliably and readily obtained by partially crosslinking the crosslinkable polymer.

Consequently, according to the invention, not only an electrode/separator layered adherent in which electrodes and a separator are firmly bonded together can be formed in situ in the course of manufacture of battery, but also a battery having low inner resistance and excellent in high rate performance can be obtained easily at a high productivity.

EXAMPLES

The invention will be explained in more detail below by way of Examples, but the invention is not limited to these Examples at all. The physical properties of porous substrate films and the battery performance are evaluated as described below.

(Thickness of Porous Substrate Film)

The thickness of a porous substrate film was measured by measuring the porous film with a $1/10000$ mm thickness gauge and a scanning electron microscopic photograph with 10,000 magnification of the cross-section of the porous film.

(Porosity of Porous Substrate Film)

The porosity of a porous substrate film was calculated from the weight W (g) per unit surface area S (cm$^2$), the average thickness t (cm) of the porous film and the density d (g/cm$^3$) of the resin forming the porous film according to the following equation:

Porosity (%)=(1-(W/S/t/d))×100

(Air Permeability of Porous Substrate Film)

It is measured according to JIS P 8117.

(Piercing Strength)

The piercing test was carried out by using a compressing tester KES-G5 manufactured by Kato Tech. Co., Ltd. The maximum load was read from the load fluctuation curve obtained by the measurement and represented as the piercing strength. Using a needle with a diameter of 1.0 mm and a curvature diameter of the tip end of 0.5 mm, the test was carried out at a speed of 2 cm/s.

(Proportion of Insoluble Matter in Reactive Polymer)

A reactive polymer-supporting porous film supporting a reactive polymer with a known weight A was weighed to measure the weight B. After the reactive polymer-supporting porous film was immersed in ethyl acetate at 23° C. for 7 days and then dried. Thereafter, the reactive polymer-supporting porous film treated in such a manner was weighed to measure the weight C. The proportion of insoluble matter in the reactive polymer was calculated according to the following equation:

Proportion of insoluble matter (%)=((A−(B−C))/A)×100

(Glass Transition Temperature of Crosslinkable Polymer)

A solution of the crosslinkable polymer was cast on release paper and dried to obtain a sheet of the polymer with a thickness of 0.2 to 0.5 mm and a width of 5 mm. The glass transition temperature of the sheet was measured using DMS 120 manufactured by Seiko Instruments Inc. under the conditions of chuck distance 10 mm and 10 KHz in bending mode. The heating speed was 5° C./min and the temperature range was in a range of 20 to 200° C. The glass transition temperature was calculated from the peak temperature of tan δ.

Reference Example 1

Preparation of Electrode Sheet 85 parts by weight of lithium cobaltate (CELLSEAD C-5H, manufactured by Nippon Chemical Industrial Co., Ltd.) as a cathode active material, 10 parts by weight of acetylene black (DENKA BLACK, manufactured by Denki Kagaku Kogyo K.K.) as a conduction aid and 5 parts by weight of vinylidene fluoride resin (KF POLYMER L#1120, manufactured by Kureha Chemical Industry Co., Ltd.) as a binder were mixed together. The resulting mixture was then mixed with N-methyl-2-pyrrolidone to prepare a slurry of a solid content of 15% by weight. The slurry was applied in a thickness of 200 μm to a 20 μm-thick aluminum foil (a collector) and the resulting product was vacuum dried at 80° C. for 1 hour and at 120° C. for 2 hours and then pressed by a roll press to obtain a cathode sheet having a layer of the active material with a thickness of 100 μm.

80 parts by weight of mesocarbon microbeads (MCMB 25-28, manufactured by Osaka Gas Chemicals Co., Ltd.) as an anode active material, 10 parts by weight of acetylene black (DENKA BLACK, manufactured by Denki Kagaku Kogyo K.K.) as a conduction aid and 10 parts by weight of vinylidene fluoride resin (KF POLYMER L#1120, manufactured by Kureha Chemical Industry Co., Ltd.) as a binder were mixed together. The resulting mixture was then mixed with N-methyl-2-pyrrolidone to prepare a slurry of a solid content of 15% by weight. The slurry was applied in a thickness of 200 μm to a 20 μm-thick copper foil (a collector) and the resulting product was vacuum dried at 80° C. for 1 hour and at 120° C. for 2 hours and then pressed by a roll press to obtain an anode sheet having a layer of the active material with a thickness of 100 μm.

Production Example 1

(Production of Crosslinkable Polymer A (Composed of 5% by Weight of 3,4-Epoxycyclohexylmethyl Acrylate Monomer Component, 20% by Weight of 3-Oxetanyl Group-Containing Monomer Component and 75% By Weight of Methyl Methacrylate Monomer Component))

60.0 g of methyl methacrylate, 16.0 g of 3-ethyl-3-oxetanylmethyl methacrylate, 4.0 g of 3,4-epoxycyclohexylmethyl acrylate, 226.6 g of ethylene carbonate and 0.15 g N,N'-azobis(isobutyronitrile) were placed in a 500 Ml Capacity three-necked flask equipped with a refluxing condenser, and stirred and mixed for 30 minutes while nitrogen gas was introduced into the flask. Then the resulting mixture was heated to 70° C. and radical polymerization was carried out over 8 hours at the temperature. The resulting reaction mixture was cooled to 40° C. 226.6 g of diethyl carbonate and 0.15 g of 2,2'-azobis(isobutyronitrile) were added to the reaction mixture and the resulting mixture was again heated to 70° C. to carry out radical polymerization at the temperature for another 8 hours. Then the resulting reaction mixture was cooled to 40° C. to obtain a solution of a polymer in a concentration of 15% by weight in a solvent of ethylene carbonate/diethyl carbonate mixture.

While being stirred by a high speed mixer, 100 g of the polymer solution was poured into 600 mL of methanol to precipitate the polymer. The polymer was separated by filtration and washed several times with methanol, placed in a drying tube, and dried by passing dried nitrogen gas (having a dew point −150° C. or lower) obtained by evaporation of liquefied nitrogen through the tube and then by further drying in vacuo in a desiccator for 6 hours, thereby obtaining a crosslinkable polymer A.

The thus obtained crosslinkable polymer A was found to be white powder and was found to have a weight average molecular weight of 344,000 and a number average molecular weight of 175,000 as measured by GPC (gel permeation chromatography). The crosslinkable polymer A was also found to have a glass transition temperature of 116° C.

Production Example 2

Production of Crosslinkable Polymer B (Composed of 5% by Weight of 3,4-Epoxycyclohexylmethyl Acrylate Monomer Component, 20% by Weight of 3-Oxetanyl Group-Containing Monomer Component, 50% by Weight of Methyl Methacrylate Monomer Component and 25% by Weight of N-Butyl Acrylate Monomer Component)

0.05 g of partially saponified polyvinyl alcohol (having a polymerization degree of 2,000 and a saponification degree of 78 mole %), 2.0 g of completely saponified polyvinyl alcohol (having a polymerization degree of 2,000 and a saponification degree of 98.5 to 99.4 mole %) and 210.0 g of ion exchanged water were placed in a 500 mL capacity three-necked flask equipped with a refluxing condenser. While nitrogen gas was introduced into the flask, the mixture was heated to 95° C. and, after the above-mentioned polyvinyl alcohols were completely dissolved, the mixture was cooled to about 30° C.

Then 40.0 g of methyl methacrylate, 4.0 g of 3,4-epoxycyclohexylmethyl acrylate, 16.0 g of 3-ethyl-3-oxetanylmethyl methacrylate, 20.0 g of n-butyl acrylate, 0.4 g of N,N'-azobis(isobutyronitrile) and 6.0 g of 1.0% by weight solution of n-dodecanethiol in diethyl carbonate as a solvent were placed in the flask and stirred and mixed for 30 minutes while nitrogen gas was introduced into the flask. Then the mixture was heated to 70° C. for carrying out suspension radical polymerization for 5 hours.

After the reaction mixture obtained in this way was filtered using a 500 mesh filtration net and washed with water, the filtered product was placed in a 500 mL capacity three-necked flask and mixed with 300 mL of ion exchanged water. The mixture was heated to 95° C. while being stirred and washed with hot water to remove the remaining polyvinyl alcohols. The resulting product was filtered using a 500 mesh filtration net and washed with water and again washed with hot water and water repeatedly. Then the product obtained was washed with methanol to remove the remaining water and then dried in vacuo to obtain a crosslinkable polymer B.

The crosslinkable polymer B was found to be white and fine granule, and have a weight average molecular weight of 224,000 and a number average molecular weight of 79,800 as measured by GPC. The crosslinkable polymer was also found to have a glass transition temperature of 41° C.

Example 1

The crosslinkable polymer A was added to ethyl acetate and stirred at room temperature so that it is dissolved therein to obtain a solution of the crosslinkable polymer A in a concentration of 10% by weight Separately, an ethyl acetate solution of propionic acid in a concentration of 10% by weight was prepared. The solution of propionic acid was gradually dropwise added to the solution of the crosslinkable polymer A while it was stirred to prepare a mixed solution of the crosslinkable polymer A and propionic acid. The molar ratio of the carboxyl groups of propionic acid to the reactive groups of the crosslinkable polymer A was adjusted to be 0.85.

The mixed solution of the crosslinkable polymer A and propionic acid was applied to both surfaces of a porous substrate film made of polyethylene resin (having a thickness of 16 μm, a porosity of 40%, an air permeability of 300 s/100 cc, a piercing strength of 3.0 N) with a wire bar (#7). The film was then heated at 50° C. to evaporate the ethyl acetate used as a solvent to obtain a crosslinkable polymer-supporting porous film in which each of the surfaces of the porous film supported the crosslinkable polymer in an amount of 2.2 g/m².

The crosslinkable polymer-supporting porous film was then placed in a thermostat at a temperature of 50° C. for 96 hours to react the crosslinkable polymer supported on the porous film with the propionic acid and partially crosslink the crosslinkable polymer thereby providing a reactive polymer-supporting porous film. The proportion of insoluble matter in the reactive polymer in the reactive polymer-supporting porous film was found to be 43%.

(Assembling of Reference Battery and Evaluation of Battery Performance)

The anode sheet obtained in Reference Example 1, the reactive polymer-carrying porous film and the cathode sheet obtained in the Reference Example 1 were layered in this order to obtain a separator/electrode sheets layered body. The layered body was placed in a 2016-size coin type battery can serving both as cathode and anode and then an electrolytic solution obtained by dissolving 1.2 mol/L of lithium hexafluorophosphate in a mixed solvent of ethylene carbonate/diethyl carbonate (1/2 ratio by weight) was poured into the battery can and then the can was sealed.

Then, the can was heated at 50° C. for 24 hours to carry out cationic polymerization and crosslinking of the reactive polymer so that the electrode sheets were each bonded to the porous film (separator) and the electrolytic solution was gelled partially, thereby to assemble a coin type lithium ion secondary battery.

The battery was subjected to charge and discharge three times at a rate of 0.2 CmA, thereafter to charge at a rate of 0.2 CmA and further thereafter to discharge at a rate of 1 CmA. The battery was found to have a discharge capacity retention of 93% in terms of a ratio of the discharge capacity at a rate of 1 CmA to the discharge capacity at a rate of 0.2 CmA.

The battery was disassembled to take out the electrode sheet/porous film (separator) adherent from the battery and the adhesion strength between the electrode sheets and the separator was measured based on the stress when the electrode sheets were each peeled from the porous film at an angle of 180° while they were still wet to find that it was 0.21 N/cm for the cathode and 0.16 N/cm for the anode.

(Measurement of Area Thermal Shrinkage Ratio of Separator (Porous Film)

The separator/electrode sheet layered body was punched in a prescribed size and was immersed in the electrolytic solution to prepare a sample. The sample was sandwiched between a pair of glass sheet and wrapped in fluorocarbon resin sheet to prevent the electrolytic solution from evaporating. A weight of 100 g was put on the wrapped sample and placed in a thermostat oven at 50° C. for 24 hours so that the reactive polymer supported on the porous film in the separator/electrode sheet layered body was cationically polymerized and crosslinked thereby bonding the electrodes to the porous film or separator.

The separator/electrode sheet adherent thus obtained was placed in a dryer at 150° C. for one hour while they were sandwiched between the pair of glass sheet and then allowed to cool to room temperature. The pair of glass sheet was removed from the adherent and the separator (porous film) was peeled from the cathode and anode and the surface area of the thus peeled separator was read by a scanner and compared with the surface area of the porous film initially used to measure the area thermal shrinkage ratio, which was found to be 5%.

Example 2

The crosslinkable polymer B was added to ethyl acetate and stirred at room temperature to dissolve the polymer therein to prepare an ethyl acetate solution of the crosslinkable polymer B in a concentration of 10% by weight Separately, an ethyl acetate solution of propionic acid in a concentration of 10% by weight was prepared. The solution of propionic acid was gradually dropwise added to the above-mentioned solution of crosslinkable polymer B while it was stirred, thereby preparing a mixed solution of the crosslinkable polymer B and propionic acid. The molar ratio of the carboxyl groups of propionic acid to the reactive groups of the crosslinkable polymer was adjusted to be 0.17.

The mixed solution of the crosslinkable polymer and propionic acid was applied to release paper with a wire bar (#7) and then heated at 50° C. to evaporate the ethyl acetate used as a solvent to form a crosslinkable polymer B/propionic acid layer on the release paper. The release paper was laminated on both surfaces of a porous substrate film made of polyethylene (having a thickness of 16 μm, a porosity of 40%, an air permeability of 300 s/100 cc, and a piercing strength of 3.0 N) in such a manner that the crosslinkable polymer B/propionic acid layer on the release paper was brought into contact with the film. The thus obtained laminate was passed through a hot roll at 70° C. and then the release papers were removed from the laminate to provide a crosslinkable polymer-supporting porous film which supported the crosslinkable polymer in an amount of 1.9 g/m² for each surface.

The crosslinkable polymer-supporting porous film was then placed in a thermostat at 50° C. for 96 hours so that the crosslinkable polymer supported on the porous film was reacted with the propionic acid and was partially crosslinked to provide a reactive polymer-supporting porous film. The proportion of insoluble matter in the reactive polymer in the reactive polymer-supporting porous film was found to be 35%.

A coin type battery of 2016-size was obtained in the same manner as Example 1 by using the above-mentioned reactive polymer-supporting porous film. The discharge capacity retention of the battery was found to be 95% as measured in the same manner as in Example 1. The battery was disassembled and the adhesion strength between the electrode sheets and the separator was measured to find that it was 0.19 N/cm for the cathode and 0.18 N/cm for the anode. The surface thermal shrinkage ratio of the separator in the separator/electrode adherent obtained by using the above-mentioned reactive polymer-supporting porous film was found to be 1.2%.

Comparative Example 1

The same polyethylene resin porous film was used as it was as a separator which had no reactive polymer supported thereon to assemble a coin type battery in the same manner as in Example 1. The battery was found to have a discharge capacity retention of 96%. The battery was disassembled and the adhesion strength between the electrode sheets and the separator was measured to find that there was no adhesion of the electrodes to the separator. The surface thermal shrinkage ratio of the separator in the separator/electrode layered body obtained by using the above-mentioned porous film that had no reactive polymer on the porous film was found to be 72%.

The invention claimed is:

1. A reactive polymer-supporting porous film for use as a battery separator which comprises a porous substrate film and a partially crosslinked reactive polymer supported on the porous substrate film, the partially crosslinked reactive polymer being obtained by the reaction of a crosslinkable polymer with a monocarboxylic acid, wherein the crosslinkable polymer has at least one reactive group selected from the group consisting of 3-oxetanyl group and epoxy group in the molecule.

2. The reactive polymer-supporting porous film according to claim 1, wherein the crosslinkable polymer is a radical copolymer of at least one radical polymerizable monomer selected from the group consisting of 3-oxetanyl group-containing radical polymerizable monomer and epoxy group-containing radical polymerizable monomer with another radical polymerizable monomer.

3. The reactive polymer-supporting porous film according to claim 1, wherein the crosslinkable polymer is a radical copolymer of 5 to 50% by weight of a 3-oxetanyl group-containing radical polymerizable monomer and/or an epoxy group-containing radical polymerizable monomer with 95 to 50% by weight of another radical polymerizable monomer.

4. The reactive polymer-supporting porous film according to claim 1, wherein the reactive polymer has insoluble matter in an amount of 1 to 90%.

5. The reactive polymer-supporting porous film according to claim 2, wherein the 3-oxetanyl group-containing radical polymerizable monomer is a 3-oxetanyl group-containing (meth)acrylate represented by the general formula (I)

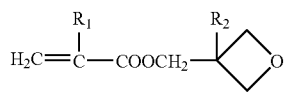
(I)

wherein $R_1$ is a hydrogen atom or a methyl and $R_2$ is a hydrogen atom or an alkyl group having 1 to 6 carbon atoms.

6. The reactive polymer-supporting porous film according to claim 2, wherein the epoxy group-containing radical polymerizable monomer is an epoxy group-containing (meth)acrylate represented by the general formula (II)

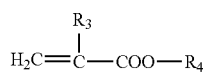
(II)

wherein $R_3$ is a hydrogen atom or a methyl group and $R_4$ is an epoxy group-containing group represented by the formula (1)

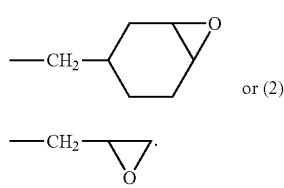
(1) or (2)

7. The reactive polymer-supporting porous film according to claim 2, wherein said another radical polymerizable monomer is at least one selected from the group consisting of (meth)acrylates represented by the general formula (III)

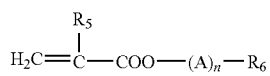
(III)

wherein $R_5$ is a hydrogen atom or a methyl group; A is an oxyalkylene group having 2 or 3 carbon atoms; $R_6$ is an alkyl group having 1 to 6 carbon atoms or a fluorinated alkyl group having 1 to 6 carbon atoms; and n is an integer of 0 to 3, and vinyl esters represented by the general formula (IV)

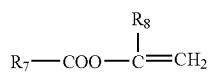
(IV)

wherein $R_7$ is a methyl or an ethyl group and $R_8$ is a hydrogen atom or a methyl group.

8. The reactive polymer-supporting porous film according to claim 1, wherein the crosslinkable polymer has a glass transition temperature of 70° C. or lower.

9. The reactive polymer-supporting porous film according to claim 1, wherein the porous substrate film has a thickness in a range of 3 to 50 μm and a porosity in a range of 20 to 95%.

10. A method of manufacturing a battery which comprises obtaining an electrode/reactive polymer-supporting porous film layered body by layering electrodes on the reactive polymer-supporting porous film according to claim 1; placing the electrode/reactive polymer-supporting porous film layered body in a battery container; introducing an electrolytic solution containing a cationic polymerization catalyst into the battery container so that at least a portion of the reactive polymer is swollen or dissolved in the electrolytic solution at least in the vicinity of the interface of the porous film and the electrodes and cationically polymerized so that the electrodes are bonded to the porous film.

11. The method of producing a battery according to claim 10, wherein the cationic polymerization catalyst is an onium salt.

12. The method of producing a battery according to claim 10, wherein the electrolytic solution contains at least one selected from the group consisting of lithium hexafluorophosphate and lithium tetrafluoroborate as an electrolytic salt working also as a cationic polymerization catalyst.

13. A method of producing the reactive polymer-supporting porous film for use as a battery separator according to claim 1, comprising supporting a crosslinkable polymer having at least one reactive group selected from the group consisting of 3-oxetanyl group and epoxy group in the molecule and a monocarboxylic acid on a porous substrate film; reacting a part of the reactive groups with the monocarboxylic acid thereby partially crosslinking the reactive polymer and forming the reactive polymer on the porous substrate film.

14. The method of producing the reactive polymer- supporting porous film according to claim 13, wherein the crosslinkable polymer and the monocarboxylic acid are supported on a porous substrate film by applying a solution containing the crosslinkable polymer and the monocarboxylic acid to release sheet; drying the solution to form a crosslinkable polymer/monocarboxylic acid layer on the release sheet; and transferring the layer to the porous substrate film from the release sheet.

15. The method of producing the reactive polymer-supporting porous film according to claim 14, wherein the crosslinkable polymer has a glass transition temperature of 70° C. or lower and the crosslinkable polymer/monocarboxylic acid layer is transferred to the porous substrate film by heating at a temperature of 100° C. or lower.

16. An electrode/porous film layered adherent obtained by layering electrodes on the reactive polymer-supporting porous film according to claim 1 thereby obtaining an electrode/reactive polymer-supporting porous film layered body and bonding the electrodes to the reactive polymer-supporting porous film.

17. The electrode/porous film layered adherent according to claim 16, wherein the porous film has an area thermal shrinkage ratio of 20% or less after it has been heated at 150° C. for 1 hour.

* * * * *